(12) United States Patent
Albrecht et al.

(10) Patent No.: US 12,424,213 B2
(45) Date of Patent: Sep. 23, 2025

(54) METHOD FOR CONTROLLING A MICROSCOPE, AND MICROSCOPE

(71) Applicant: Carl Zeiss Meditec AG, Jena (DE)

(72) Inventors: Christian Albrecht, Aalen (DE); Stefan Saur, Aalen (DE)

(73) Assignee: CARL ZEISS MEDITEC AG, Jena (DE)

(*) Notice: Subject to any disclaimer, the term of this patent is extended or adjusted under 35 U.S.C. 154(b) by 436 days.

(21) Appl. No.: 17/529,036

(22) Filed: Nov. 17, 2021

(65) Prior Publication Data

US 2022/0157306 A1    May 19, 2022

(30) Foreign Application Priority Data

Nov. 19, 2020    (DE) ...................... 10 2020 214 610.1

(51) Int. Cl.
*G02B 21/00*    (2006.01)
*G06V 10/70*    (2022.01)
(Continued)

(52) U.S. Cl.
CPC ............ *G10L 15/22* (2013.01); *G06V 10/768* (2022.01); *G10L 25/51* (2013.01); *G06N 20/00* (2019.01);
(Continued)

(58) Field of Classification Search
USPC ........... D24/107–234; 704/1–275; 706/1–62, 706/900–903; 600/109–245; 850/1–10
See application file for complete search history.

(56) References Cited

U.S. PATENT DOCUMENTS 10,705,323 B2 * 7/2020 Mak ...................... H04N 23/69
2018/0284414 A1    10/2018 Kleppe
(Continued)

FOREIGN PATENT DOCUMENTS

DE    10 2015 219 121 A1    4/2017
WO    WO 2014/172334 A1    10/2014
(Continued)

OTHER PUBLICATIONS

Wada Seiji; Controller of Medical System, Control Method of Medical System, and Medical System; Oct. 18, 2018 (Year: 2018).*
(Continued)

*Primary Examiner* — Marcellus J Augustin
(74) *Attorney, Agent, or Firm* — NIXON PEABODY LLP; Jeffrey L. Costellia

(57) ABSTRACT

The invention relates to a method for controlling a microscope, wherein a voice information item is captured by means of at least one microphone, wherein, based on the captured voice information item, a command assigned to the voice information item is recognized from a plurality of commands, wherein an operational context, in which the microscope is when the voice information item is captured, is determined based on at least one context information item, wherein at least one microscope action is determined in consideration of the recognized command, and wherein at least one control command is generated to control the microscope to carry out the at least one determined microscope action, and wherein the at least one microscope action is carried out by controlling the microscope by means of the generated at least one control command, wherein the associated command is recognized in consideration of the determined operational context, and/or wherein the at least one microscope action is determined in consideration of the (Continued)

determined operational context. Further, the invention relates to a microscope.

14 Claims, 1 Drawing Sheet

(51) Int. Cl.
*G10L 15/22* (2006.01)
*G10L 25/51* (2013.01)
*G06N 20/00* (2019.01)

(52) U.S. Cl.
CPC .. *G10L 2015/223* (2013.01); *G10L 2015/228* (2013.01)

(56) References Cited

U.S. PATENT DOCUMENTS

| | | | |
|---|---|---|---|
| 2018/0336913 A1 | 11/2018 | Arndt | |
| 2019/0324252 A1* | 10/2019 | Mak | G02B 21/24 |
| 2021/0356728 A1 | 11/2021 | Kleppe | |
| 2022/0141376 A1* | 5/2022 | Yamaguchi | A61B 34/25 348/77 |

FOREIGN PATENT DOCUMENTS

| | | |
|---|---|---|
| WO | WO 2017/055558 A1 | 4/2017 |
| WO | WO 2018/226756 A1 | 12/2018 |

OTHER PUBLICATIONS

Controller of Medical System, Control Method of Medical System, and Medical System (Year: 2018).*

* cited by examiner

METHOD FOR CONTROLLING A MICROSCOPE, AND MICROSCOPE

CROSS-REFERENCE TO RELATED APPLICATIONS

This application claims foreign priority under 35 U.S.C. § 119 to and the benefit of German Patent Application No. 10 2020 214 610.1, filed on Nov. 19, 2020, which is incorporated herein by reference in its entirety.

FIELD OF THE INVENTION

The invention relates to a method for controlling a microscope and to a microscope.

BACKGROUND

When operating microscopes, in particular surgical microscopes, a mode of operation that is as contact-free as possible is desirable in order to avoid dirtying and contaminations and in order not to impair sterility in the operating room. In addition to control by means of gestures or so-called mouth switches, it is known to control a microscope by way of voice commands. For such voice control, various activation mechanisms (keywords, etc.) and command sequences (e.g., parameter+new value) are known for control purposes.

DE 10 2015 219 121 A1 has disclosed a microscope control method for operating a microscope, including the steps of: capturing acoustic, graphically represented and/or electronically coded voice information; comparing the voice information with stored reference commands and ascertaining a voice command on the basis of a predetermined degree of correspondence between at least one portion of the voice information and a reference command; selecting that reference command to which the voice command corresponds at least to a predetermined degree; generating at least one control command suitable for operating the microscope, wherein the control command is either an invariable control command assigned to the selected reference command or the control command is generated on the basis of a rule assigned to the reference command for forming a generated control command, and controlling the microscope by means of the assigned or generated control command. Further, a microscope is known, which is designed to carry out the microscope control method.

SUMMARY OF THE INVENTION

The invention is based on the object of developing a method for controlling a microscope, and a microscope, in which a voice control, in particular, is improved.

According to the invention, the problem is solved by a method having the features of patent claim 1 and a microscope having the features of patent claim 7. Advantageous configurations of the invention emerge from the dependent claims.

It is one of the basic concepts of the invention to develop a voice control in which a microscope action to be implemented based on a captured voice information item and a command determined therefrom is determined in consideration of an operational context, in which the microscope is when the command is captured and recognized. The underlying idea is that of designing commands to be simple in order to keep control of the microscope as simple and intuitive as possible. The problem of the same command possibly having different meanings in different situations or operational contexts and therefore different microscope actions also being desired, which occurs in this case, is solved by taking into account the operational context. As a result, this may bring about, in a context-dependent fashion, a desired microscope action by means of a command provided by way of the voice information. As an alternative or in addition thereto, provision is made for the command to be recognized in consideration of the determined operational context. The underlying idea is that the determined operational context may aid a better selection in the case of a plurality of possible command candidates, for example in the case of tonal ambiguities in the captured voice information item.

In particular, a method for controlling a microscope, in particular a surgical microscope, is made available, wherein a voice information item is captured by means of at least one microphone, wherein, based on the captured voice information item, a command assigned to the voice information item is recognized from a plurality of commands, wherein an operational context, in which the microscope is when the voice information item is captured, is determined based on at least one context information item, wherein at least one microscope action is determined in consideration of the recognized command, and wherein at least one control command is generated to control the microscope to carry out the at least one determined microscope action, and wherein the at least one microscope action is carried out by controlling the microscope by means of the generated at least one control command, wherein the associated command is recognized in consideration of the determined operational context, and/or wherein the at least one microscope action is determined in consideration of the determined operational context.

Further, in particular a microscope, more particularly a surgical microscope, is developed, comprising at least one microphone which is configured to capture a voice information item, and a control device, wherein the control device is configured, based on the captured voice information item, to recognize a command assigned to the voice information item from a plurality of commands, to determine an operational context, in which the microscope is when the voice information item is captured, based on at least one context information item, to determine at least one microscope action in consideration of the recognized command, to generate at least one control command for controlling the microscope to carry out the at least one determined microscope action, and to carry out the at least one microscope action by controlling the microscope by means of the generated control command, wherein the control device is further configured to recognize the associated command in consideration of the determined operational context, and/or to determine the at least one microscope action in consideration of the determined operational context.

An advantage of the method and of the microscope is that voice commands can be designed to be simple and can be used differently. Different microscope actions may be caused in different operational contexts of the microscope by way of the same voice commands. This facilitates a more intuitive control by means of voice and operating convenience can be increased.

A further advantage of the method and of the microscope is that, as an alternative or in addition thereto, it is possible to improve the assignment of the command to the captured voice information. The assignment can be improved in the case of tonal ambiguities in particular, since by way of the determined operational context additional information items are available, and can be made useful, when recognizing the assignment.

The at least one microphone can be arranged on the microscope itself, for example in the vicinity of an eyepiece or a display device. Further, the microphone can also be arranged on the body of a user of the microscope, in particular on the head or in the vicinity of the head. It is also possible to use a plurality of microphones. The microphone captures the voice information item and provides a signal derived from the captured voice information item for the control device. If the microscope has a display device, for example for displaying a microscope image captured by means of a camera, the display device can also be part of the head-mounted visualization system, for example a head-mounted display or AR glasses. In that case, the microphone can also be part of such a visualization system.

Based on the captured voice information item, a command assigned to the voice information item is recognized from a plurality of commands. In particular, this is implemented by means of voice recognition methods known per se, in the case of which the captured voice information item is for example initially converted into text and the text is subsequently compared to a plurality of text-encoded commands. Then, the associated command is selected on account of a comparison result. By way of example, the command which has the greatest correspondence with the text derived from the voice information item is selected. Exemplary commands for the microscope relate to changing the focus or setting the focus, changing the magnification and/or moving the microscope in different directions. Machine learning methods, for example trained artificial neural networks or Bayesian networks, can also be used when recognizing the command.

Based on at least one context information item, an operational context, in which the microscope is when the voice information item is captured, is also determined. Such an operational context describes, in particular, a situation and/or comprises information items relating to a situation in which the microscope is currently used. In the case of a surgical microscope the operational context is, for example, a step in a surgery plan (e.g., approaching a brain tumor or suturing tissue). The operational context facilies improved understanding or improved classification of the recognized command in an overall context. In particular, there can be improved determination of a microscope action intended by a user from the output of the voice information item and the associated command, and so misunderstandings and incorrect operations can be prevented or at least reduced. As an alternative or in addition thereto, the determined operational context is considered when recognizing the command which has been or is assigned to a captured voice information item.

At least one microscope action is determined in consideration of the recognized command. In an alternative of the invention, provision is made for the determined operational context to be taken into account in this case. In this context, there can be for example a rules-based assignment, in the case of which the commands are respectively linked to different microscope actions on the basis of the operational context and can be selected in accordance with the assignment. By way of example, the rules-based assignment can be in the form of a decision tree. The rules-based assignment can be or have been defined manually or can be, or could have been, determined in automated fashion on the basis of empirical data or trials.

To carry out the at least one determined microscope action, at least one control command for controlling the microscope is generated. The control command comprises control signals and/or control data in particular, by means of which it is possible to control an actuator system of the microscope such that the determined microscope action is carried out.

The at least one microscope action is carried out by controlling the microscope by means of the generated at least one control command. To this end, the generated control signals and/or control data of the actuator system of the microscope are supplied, in particular, and the actuator system is controlled and/or regulated accordingly.

In particular, provision is made for the method to be repeated cyclically such that a continuous control by means of voice is rendered possible, in particular on the basis of a current operational context in each case.

The control device may be embodied, either individually or together with other devices, as a combination of hardware and software, for example as program code that is executed on a microcontroller or microprocessor. The control device comprises, in particular, a computing device and a memory device and suitable interfaces for receiving the captured voice information item from the at least one microphone and for controlling an actuator system of the microscope.

In an embodiment, provision is made for the at least one context information item to be generated based on at least one captured microscope image and/or at least one captured microscope video. As a result thereof, an operational context can be determined directly from a region imaged by the microscope. In particular, a microscope image and/or a microscope video comprise a region captured by a user by means of the microscope, for example a situs in the case of surgery. To generate the at least one context information item use can be made of, for example, pattern recognition methods and/or object recognition methods. As a result, patterns and/or objects imaged in a captured microscope image and/or in a captured microscope video can be recognized and an information item derived from a recognition result can be provided as a context information item. Machine learning methods can also be used here.

In an embodiment, provision is made for the at least one control command to be generated in consideration of at least one captured microscope image and/or at least one captured microscope video. As a result, it is possible to realize closed-loop control of an actuator system of the microscope in particular, within the scope of which feedback can be implemented by way of the at least one captured microscope image and/or the at least one captured microscope video. An exemplary microscope action is a change in the focus on an object imaged in the captured microscope image and/or microscope video, for example on a situs or a surgical instrument, wherein to this end control commands are transmitted to an actuator system of an optical imaging device of the microscope until the focus has been altered accordingly. Pattern recognition methods and/or object recognition methods, and machine learning methods can also be used here.

In an embodiment, provision is made for the at least one context information item to be generated based on at least one ambient noise captured by means of the at least one microphone, or to comprise such an ambient noise. As a result thereof, an operational context can be captured from an operational environment of the microscope. By way of example utterances by users or assistants can be captured and recognized. An operational context of the microscope can be determined in this way. Noises from other devices or tools, for example from surgical instruments, can provide information items in relation to a current operational context. Machine learning methods can be trained and used to recognize and interpret ambient noises.

In one embodiment, provision is made for the at least one context information item to be generated based on an operational plan of the microscope and/or a surgery plan, and/or to comprise an operational plan and/or surgery plan. As a result thereof, the operational context can be determined in consideration of a current position in the operational plan and/or the surgery plan. In this case, the operational plan and/or surgery plan comprises, in particular, individual partial steps for which the microscope is used in a manner following a specified sequence. The operational state of the microscope can be determined in improved fashion by knowledge of the respectively currently carried out partial step in the operational plan and/or surgery plan. In the case of surgery the partial steps are for example: "approaching a brain tumor" or "suturing operated-on tissue" Then, different microscope actions can be provided for a recognized command in these partial steps.

In an embodiment, provision is made for the at least one context information item to be generated based on at least one microscope parameter and/or an operational state of the microscope and/or at least one parameter and/or an operational state of at least one external controller and/or at least one tool, and/or to comprise these. As a result, technical parameters (e.g., a specific or context-dependent configuration) or a technical operational state of the microscope and/or other devices or tools, for example surgical instruments, can also be considered. By way of example, a current operational context can be deduced from a capture or display mode (e.g., operation with visible light or operation in a fluorescence mode, filters employed, etc.) of the microscope. The at least one parameter and/or the operational state of the microscope and/or the external controller and/or the tool is queried, for example, by the control device of the microscope and/or a control of the external controller and/or tool, and/or is transmitted therefrom to the control device.

In an embodiment, provision is made for the at least one context information item and/or the operational context to be determined by means of at least one machine learning method and/or for the at least one microscope action to be determined by means of at least one machine learning method. To this end, it is possible in particular to learn links between the at least one context information item and operational contexts with the aid of supervised or unsupervised machine methods. After learning, the current operational context of the microscope, based on the at least one context information item, can be estimated with the aid of the trained machine learning method. Subsequently, the associated command can be recognized in consideration of the operational context determined in this way and/or the at least one microscope action can be determined, in particular estimated, based on the operational context determined in this way and the recognized command. To determine the at least one microscope action it is also possible to learn a machine learning method in supervised or unsupervised fashion. By way of example, a machine learning method is an artificial neural network or a Bayesian network.

In an embodiment, provision is made for the determined at least one microscope action to have to be confirmed before being carried out. As a result, the at least one microscope action can be checked in terms of content before it is implemented such that the implementation of an undesired microscope action can be prevented. To this end, a user of the microscope can be queried, for example, within the scope of which the user must confirm the implementation by way of a voice command, a gesture, and/or a foot switch.

Content of the at least one microscope action can also be displayed and/or communicated within the scope of the query.

Further features relating to the configuration of the microscope arise from the description of configurations of the method. Here, the advantages of the microscope are respectively the same as in the configurations of the method.

BRIEF DESCRIPTION OF THE DRAWINGS

The invention is explained in greater detail below on the basis of preferred exemplary embodiments with reference to the figures. In the figures.

DETAILED DESCRIPTION

Figure 1:
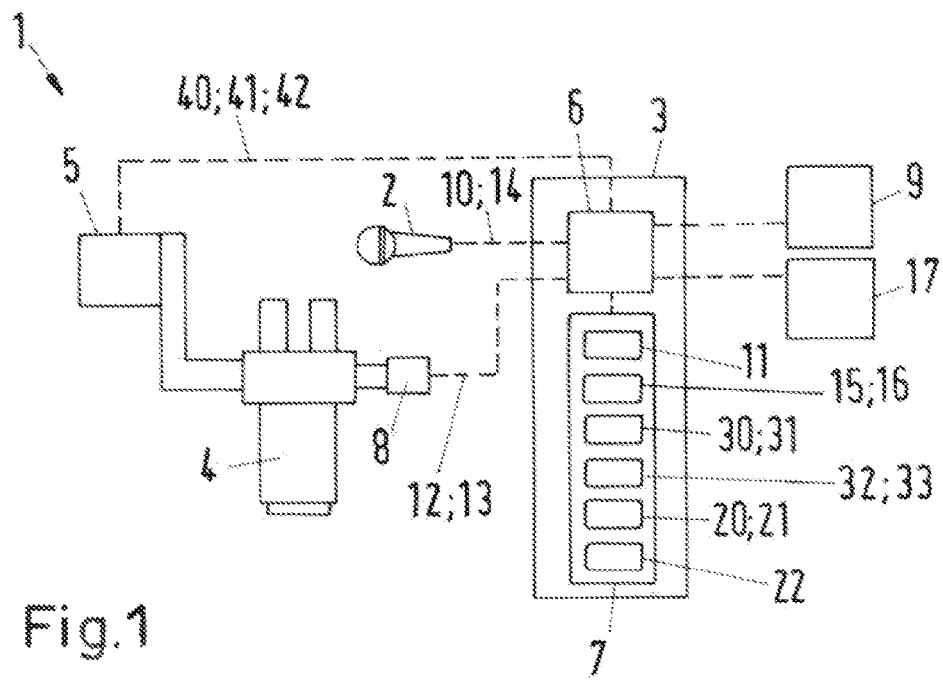
FIG. 1 shows a schematic illustration of one embodiment of the microscope.

FIG. 1 shows a schematic illustration of one embodiment of the microscope 1. The method described in this disclosure is explained in more detail below on the basis of the microscope 1.

In particular, the microscope 1 is a surgical microscope. The microscope 1 comprises a microphone 2 and a control device 3. Further, the microscope 1 comprises an optical imaging system 4 and an actuator system 5, by means of which the optical imaging system 4 can be altered in terms of its relative position and configuration (magnification, focus, etc.). Further, the microscope 1 can comprise an optical capture device 8 in the form of a camera, and a display device 9.

The control device 3 comprises a computing device 6, which is connected to a memory 7. The computing device 6 can carry out computing operations on data stored in the memory 7. By way of example, the computing device 6 comprises a microprocessor which can be used to execute program code stored in the memory 7.

According to the method, a voice information item 10 is captured by means of the microphone 2 in order to control the microscope 1. By way of example, a user of the microscope 1, for example a surgeon, can speak into the microphone 2 providing such a voice information item 10 if a change in the state of the microscope 1 is desired. The captured voice information item 10 is fed to the computing device 6, for example in the form of an analog or digital signal.

Based on the captured voice information item 10, the computing device 6 recognizes a command 21 assigned to the voice information item 10 from a plurality of commands. In this case, use can be made of voice recognition methods known per se, even using machine learning methods such as trained neural networks, for example.

Further, based on at least one context information item 11, the computing device 6 determines an operational context 20, in which the microscope 1 is when the voice information item 10 is captured.

Provision can be made for the at least one context information item 11 to be generated by means of the computing device 6 based on at least one microscope image 12 captured by means of the optical capture device 8 and/or at least one captured microscope video 13. In this case, it is possible to use methods of pattern recognition and/or machine learning, for example in order to interpret a content of the microscope image 12 and/or of the microscope video 13, for example in order to recognize objects and/or patterns, and provide an interpretation result, for example information items in relation to recognized objects and/or patterns, as context information item 11.

Further, provision can be made for the at least one context information item 11 to be generated based on at least one ambient noise 14 captured by means of the at least one microphone 2, or to comprise such an ambient noise 14. An ambient noise 14 can likewise be evaluated by means of the computing device 6 using pattern recognition methods and/or voice recognition methods, with an evaluation result being provided as a context information item 11.

Further, provision can be made for the at least one context information item 11 to be generated based on an operational plan 15 of the microscope 1 and/or a surgery plan 16, and/or to comprise an operational plan 15 and/or surgery plan 16. By way of example, a step currently present can be determined within the plans 15, 16 on account of a sequence of individual steps described in the operational plan 15 and/or the surgery plan 16 (e.g., approaching a tumor, removing the tumor, suturing, etc.), a context information item 11 being derived from the content of the current step. By way of example, the operational plan 15 and/or surgery plan 16 can by means of the computing device 6 be queried from a database (not shown) and/or be provided therefrom, or be loaded to the memory 7 at the start of the microscope 1 use.

When determining the operational context 20 the computing device 3 can use rule systems, for example, by means of which the respective operational context 20 can be deduced based on the presence of different characteristics of the at least one context information item 11. Here, fuzzy logic can also be used in addition to unique links.

Provision can be made for the at least one context information item 11 to be generated based on at least one microscope parameter 31 and/or operational state 30 of the microscope 1 and/or a parameter 32 and/or operational state 33 of an external controller and/or tool, and/or to comprise these.

Further, provision can be made for the at least one context information item 11 and/or the operational context to be determined by means of at least one machine learning method.

In consideration of the recognized command 21 and the determined operational context 20 the computing device 6 determines at least one microscope action 22. A rule system can also be used here, within the scope of which combinations of in each case one command 21 and one operational context 20 are respectively linked to at least one microscope action 22.

Provision can be made for the at least one microscope action 22 to be determined by means of at least one machine learning method, for example by means of an artificial neural network trained to this end.

To carry out the at least one determined microscope action, at least one control command 40 for controlling the microscope 1 is generated by means of the computing device 6. To this end, the computing device 6 determines in particular which control data 41 and/or control signals 42 are required to carry out the determined at least one microscope action 22. In particular, the at least one control command 40 comprises the control data 41 and/or control signals 42.

The at least one microscope action 22 is carried out by controlling the actuator system 5 of the microscope 1 by means of the generated at least one control command 40. To this end, the computing device 6 transmits the control data 41 and/or the control signals 42 to the actuator system 5 of the microscope 1, which implements the microscope action 22 in controlled or regulated fashion.

Provision can be made for the determined at least one microscope action 22 to have to be confirmed before being carried out. To this end, the control device 3 can for example generate a request and output the latter visually on the display device 9 or acoustically by means of a loudspeaker 17. A response to the request is captured by means of the microphone 2 as a voice information item 10 and is evaluated by means of the computing device 6. Depending on the content of the evaluation result, the determined at least one microscope action 22 is or is not carried out. As an alternative or in addition thereto, provision can also be made for the at least one microscope action 22 to have to be confirmed by means of a foot switch (not shown).

As an alternative or in addition thereto, provision can be made for the assigned command 21 to be recognized in consideration of the determined operational context 20. To this end, the determined operational context 20 is considered during the voice recognition performed by means of the computing device 6. By way of example, the determined operational context 20 can be fed to a trained machine learning method in the form of additional input data.

Figure 2:
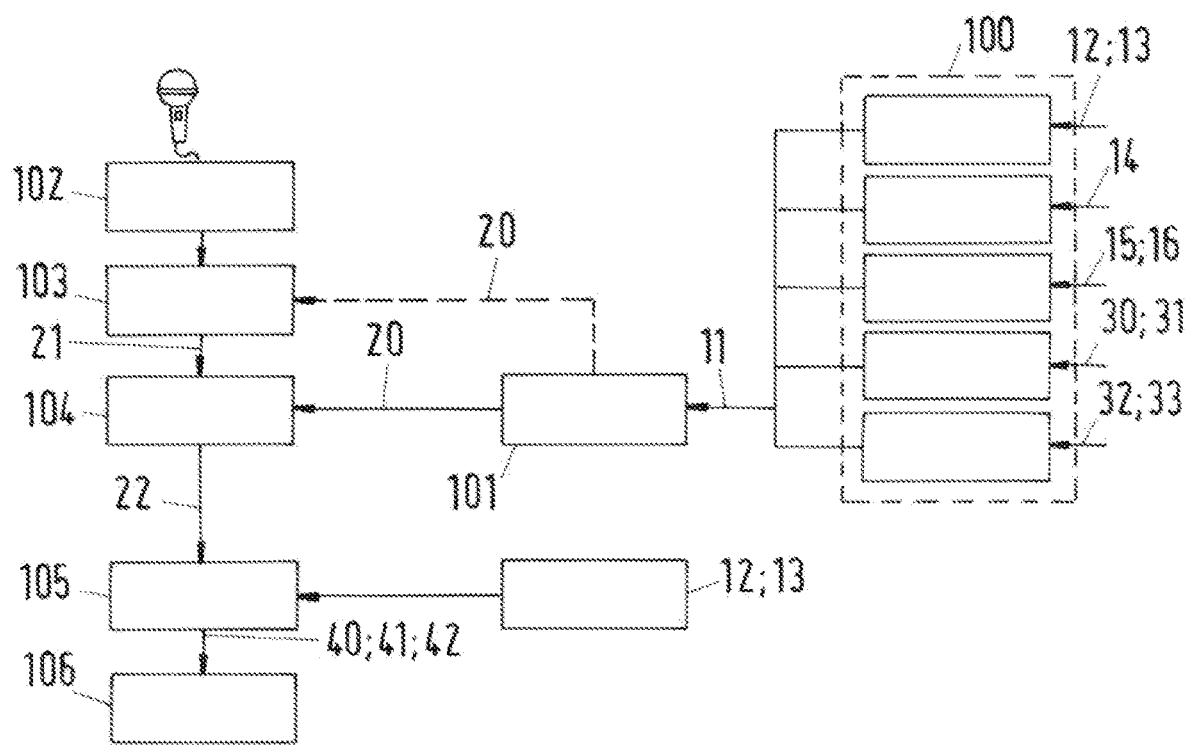
FIG. 2 shows a schematic flowchart for elucidating embodiments of the method for controlling a microscope.

Shown in FIG. 2 is a schematic flowchart of an embodiment of the method for controlling a microscope, in particular a surgical microscope, on the basis of an exemplary application. The application is embedded in a neurosurgical operation for removing a deep tumor. In this case, the surgical microscope continuously analyzes a microscope video 13 which is captured by means of an optical capture device, in particular a camera, and in which a region captured by the microscope is imaged in each case. A surgeon works their way forward to the tumor by aspirating brain tissue.

In a measure 100, the microscope recognizes a movement carried out during the approach in the captured microscope video 13 by means of the control device and generates a corresponding context information item 11.

In a measure 101, the control device determines, based on the context information item 11, an operational context 20 of the microscope, the "approach" surgical application or surgery step in the example. In this case, it is possible to consider not only a current time or time step in measure 101, but also preceding times or time steps.

In a measure 102, a voice information item is captured by means of at least one microphone which is arranged on the head of the surgeon, for example. The voice information item comprises a voice command "focus", for example.

Based on the captured voice information item, a command 21 assigned to the voice information item 21 is recognized from a plurality of commands in a measure 103. In particular, this is implemented by means of voice recognition methods known per se. The plurality of commands are provided for example in the form of a list, wherein the list is compared to the voice information item or to an information item derived therefrom, in particular text recognized based on the voice information item. A command 21 is identified and selected from the list on the basis of a comparison result.

In a measure 104, at least one microscope action 22 is determined in consideration of the recognized command 21. In particular, provision is made here for the at least one microscope action 22 to be determined in consideration of the determined operational context 20. For the determination a rule system can be used, within the scope of which combinations formed in each case from one command 21 and one operational context 20 are linked to at least one microscope action 22. However, machine learning methods can also be used to determine the at least one microscope action 22. In the present example, the combination of the recognized command 21 "focus" and the operational context 20 "approach" is linked to the microscope action 22 which comprises focusing on the situs in the vicinity of the instrument tip. In other words, information fusion takes place in measure 104, with the result thereof being the microscope action 22.

In a measure 105, at least one control command 40 is generated to control the microscope to carry out the at least one determined microscope action 22. By way of example, the control command 40 comprises the instruction that an actuator system is controlled or regulated in such a way that an optical imaging system of the microscope is focused on the situs in the vicinity of the instrument tip. To this end, the control device determines an actual state of the actuator system and/or of the optical imaging device and, based on the at least one control command 40, determines an intended state of the actuator system and/or of the optical imaging device. Based on the respective current actual state and the determined intended state the control device generates control signals 42 and/or control data 41 in order to bring the actuator system from the actual state to the determined intended state. In this case, provision is made for a current microscope image 12 and/or a current microscope video 13 to be considered for determining the current actual state for each time step in order thereby to determine a current actual state of the focusing.

In a measure 106, the at least one microscope action 22 is carried out by controlling the actuator system of the microscope by means of the generated at least one control command 40, in particular by means of the generated control signals 42 and/or control data 41. In this case, measures 105 and 106 are repeated until the desired intended state ("focusing on the situs") is reached.

Once the tumor has been successfully removed and the dura should subsequently be sutured, the control device recognizes on the basis of a current microscope image 12 and/or a current microscope video 13 that an aspirator has been removed from the situs, but a needle and suturing material can be recognized instead in the captured microscope image 12 or in the captured microscope video 13. Accordingly, based on the appropriate context information item 11, the control device in measure 101 then determines an operational context 20 of the microscope corresponding to the "suturing" surgery application or surgical step.

For a voice information item (likewise "focus") which was captured in measure 102 and which was assigned the same command 21 "focus" in measure 103, a different microscope action 22 is now however determined in measure 104 since although the recognized command 21 is the same, the determined operational context 20 has changed. The other microscope action 22 now comprises focusing not on the situs but on an instrument tip even if the latter is located above the situs since such a focusing simplifies threading a thread and making knots during suturing. Thereupon, measures 105 and 106 are carried out accordingly such that the actuator system is controlled or regulated in such a way that the instrument tip is imaged in focus.

As an alternative or in addition thereto, provision can be made for the assigned command 21 to be recognized in measure 103 in consideration of the determined operational context 20. The following is an example in which considering the determined operational context 20 assists in recognizing the assigned command 21: The voice commands "move" (for moving the microscope) and "movie" (for starting a video recording) are linguistically very similar. However, if video recording has already started, that is to say if the operational context 20 determined in measure 101 comprises a video recording being active, it can be assumed with a high probability that the surgeon wishes to move the microscope. Therefore, the command 21 "move" for moving the microscope is recognized accordingly in measure 103. By contrast, if no video recording is active and the fact that something unpredictable is happening in the situs is recognized based on captured microscope images 12 and/or a captured microscope video 13, the command 21 "movie" to start the video recording is recognized in measure 103. When the associated command 21 in consideration of the determined operational context 20 is recognized, the determined operational context 20 in addition to the captured voice information item can form, in particular, an input datum of a (trained) machine learning method.

In addition to the captured microscope images 12 and/or a captured microscope video 13, provision can be made in other applications for a context information item 11 to be generated in measure 100 based on at least one ambient noise 14 captured by means of the at least one microphone.

Further, provision can be made in measure 100 for the at least one context information item 11 to be generated based on an operational plan 15 of the microscope and/or a surgery plan 16.

Provision can also be made, in measure 100, for the at least one context information item 11 to be generated based on at least one microscope parameter 31 and/or an operational state 30 of the microscope and/or at least one parameter 32 and/or an operational state 33 of at least one external controller and/or at least one tool.

In a further application, the control device of the microscope continuously analyzes a data stream of a captured microscope video 13 during a neurosurgical operation for treating an aneurysm, during which the surgeon incrementally works their way closer to the lesion. The basic procedure corresponds to the flowchart shown in FIG. 2.

On the basis of a context information item 11 relating to an activity in the situs and a generated context information item 11 relating to the fact that according to an operational state 30 of the microscope no fluorescence mode (e.g., IR800) has yet been used, the control device recognizes that the surgeon is still in the "approach" phase as provided for in accordance with the surgery plan 16. Based on a determined operational context 20 by the control device in this phase in measure 104, a "zoom" voice command given by the surgeon is now interpreted in such a way that an overall magnification on the situs should be set such that the instrument tips are easily visible but, at the same time, the surrounding tissue should continue to remain easily visible for a better overview. A corresponding microscope action 22 is then determined in measure 104.

By contrast, if the control device recognizes that the surgeon is already in the "clipping" phase for the aneurysm on the basis of the context information item 11 generated from the captured microscope video 13, a "zoom" voice command in measure 104 is by contrast interpreted to the effect of the overall magnification on the situs being intended to be set such that the vessel to be clipped is maximally visible. A corresponding microscope action 22 is then determined in measure 104 based on a corresponding operational context 20.

LIST OF REFERENCE SIGNS

1 Microscope
2 Microphone
3 Control device

4 Optical imaging system
5 Actuator system
6 Computing device
7 Memory
8 Optical capture device
9 Display device
10 Voice information
11 Context information
12 Microscope image
13 Microscope video
14 Ambient noise
15 Operational plan
16 Surgery plan
17 Loudspeaker
20 Operational context
21 Assigned command
22 Microscope action
30 Operational state
31 Microscope parameter
32 Parameter (external controller/tool)
33 Operational state (external controller/tool)
40 Control command
41 Control data
42 Control signal
100-106 Measures

The invention claimed is:

1. A method for controlling a microscope, comprising:
capturing a voice information item by at least one microphone,
recognizing a voice command assigned to the voice information item from a plurality of voice commands based on the voice information item,
determining an operational context, in which the microscope is when the voice information item is captured, based on one or more context information items,
determining at least one microscope action in consideration of the voice command,
generating at least one control command to control the microscope to carry out the at least one microscope action, and
carrying out the at least one microscope action by controlling the microscope based on the at least one control command,
wherein a meaning of the voice command is defined in consideration of the operational context, and
wherein at least one of the one or more context information items is generated based on at least one captured microscope image and/or at least one captured microscope video.

2. The method as claimed in claim 1, wherein at least one of the one or more context information items is generated based on at least one ambient noise captured by the at least one microphone, or comprises such an ambient noise.

3. The method as claimed in claim 1, wherein at least one of the one or more context information items is generated based on an operational plan of the microscope and/or a surgery plan, and/or comprises an operational plan and/or a surgery plan.

4. The method as claimed in claim 1, wherein at least one of the one or more context information items is generated based on at least one microscope parameter and/or an operational state of the microscope and/or at least one parameter and/or an operational state of at least one external controller and/or at least one tool, and/or comprises these.

5. The method as claimed in claim 1, wherein at least one of the one or more context information items and/or the operational context is determined by at least one machine learning method and/or wherein the at least one microscope action is determined by at least one machine learning method.

6. The method as claimed in claim 1, wherein the determined at least one microscope action must be confirmed before being carried out.

7. The method as claimed in claim 1, wherein the voice information item is captured by the at least one microphone independent from a prompt.

8. The method as claimed in claim 1, wherein at least one of the one or more context information items is generated based on one or more noises from one or more devices and/or tools within an operational environment of the microscope.

9. The method as claimed in claim 1, wherein, if the voice command cannot be recognized between at least two possible voice commands based on the voice information item, the recognizing the voice command is performed by distinguishing between the at least two possible voice commands based, at least in part, on the determined operational context.

10. The method as claimed in claim 1, wherein the one or more context information items associated with the microscope are determined based on a plurality of preceding times and/or time steps prior to the determination.

11. The method as claimed in claim 1, wherein at least one of the one or more context information items is generated based on one or more devices and/or tools in the at least one captured microscope image and/or the at least one captured microscope video.

12. The method as claimed in claim 1, wherein the meaning of the voice command comprises a center of interest within the at least one captured microscope image and/or at least one captured microscope video to which the voice command is directed.

13. A microscope, comprising:
at least one microphone configured to capture a voice information item, and
a control device, wherein the control device is configured, based on the captured voice information item, to:
recognize a voice command assigned to the voice information item from a plurality of voice commands,
determine an operational context, in which the microscope is when the voice information item is captured, based on one or more context information items,
determine at least one microscope action in consideration of the voice command,
generate at least one control command for controlling the microscope to carry out the at least one microscope action,
carry out the at least one microscope action by controlling the microscope by the control command,
wherein a meaning of the voice command is defined in consideration of the operational context, and wherein at least one of the one or more context information items is generated based on at least one captured microscope image and/or at least one captured microscope video.

14. A method for controlling a microscope, comprising:
capturing an unprompted voice information item by at least one microphone,
recognizing a voice command assigned to the unprompted voice information item from a plurality of voice commands based on the unprompted voice information item,
after the recognizing the voice command, determining an operational context, in which the microscope is when the unprompted voice information item is captured, based on one or more context information items, determining at least one microscope action in consideration of the voice command, generating at least one control command to control the microscope to carry out the at least one microscope action, and carrying out the at least one microscope action by controlling the microscope based on the at least one control command, wherein (i) the voice command is recognized in consideration of the operational context nd/or (ii) the at least one microscope action is determined in consideration of the determined operational context, and wherein (a) at least one of the one or more context information items is generated based on at least one captured microscope image and/or at least one captured microscope video, and/or (b) the at least one control command is generated based on at least one captured microscope image and/or at least one captured microscope video.

* * * * *